(12) United States Patent
Shi et al.

(10) Patent No.: US 6,876,989 B2
(45) Date of Patent: Apr. 5, 2005

(54) BACK-PROPAGATION NEURAL NETWORK WITH ENHANCED NEURON CHARACTERISTICS

(75) Inventors: Bingxue Shi, Beijing (CN); Chun Lu, Beijing (CN); Lu Chen, Beijing (CN)

(73) Assignee: Winbond Electronics Corporation, Hsinchu (TW)

(*) Notice: Subject to any disclaimer, the term of this patent is extended or adjusted under 35 U.S.C. 154(b) by 570 days.

(21) Appl. No.: 10/073,224

(22) Filed: Feb. 13, 2002

(65) Prior Publication Data

US 2003/0154175 A1 Aug. 14, 2003

(51) Int. Cl.[7] ............................. G06G 7/00; G06F 15/18
(52) U.S. Cl. ........................................ 706/39; 706/31
(58) Field of Search ...................... 706/39, 31

(56) References Cited

U.S. PATENT DOCUMENTS 5,479,579 A * 12/1995 Duong et al. ................ 706/36
5,592,589 A * 1/1997 Poon ............................ 706/25

OTHER PUBLICATIONS

Lee et al, "The Effect of Initial Weights on Premature Saturation Back–Propagation Learning", IJCNN Jul. 1991.*

* cited by examiner

Primary Examiner—George Davis
(74) Attorney, Agent, or Firm—Finnegan, Henderson, Farabow, Garrett & Dunner, L.L.P.

(57) ABSTRACT

A neural network system includes a feedforward network comprising at least one neuron circuit for producing an activation function and a first derivative of the activation function and a weight updating circuit for producing updated weights to the feedforward network. The system also includes an error back-propagation network for receiving the first derivative of the activation function and to provide weight change data information to the weight updating circuit.

25 Claims, 9 Drawing Sheets

BACK-PROPAGATION NEURAL NETWORK WITH ENHANCED NEURON CHARACTERISTICS

DESCRIPTION OF THE INVENTION

1. Field of the Invention

The present invention relates to the field of neural networks. More particularly, the present invention, in various specific embodiments, involves methods and systems directed to providing a back-propagation neural network with enhanced neuron characteristics.

2. Background of the Invention

Neural networks provide a practical approach to a wide range of problems. Specifically, they offer new and exciting possibilities in fields such as pattern recognition where traditional computational methods have not been successful. Standard computing methods rely on a linear approach to solve problems, while neural networks use a parallel approach similar to the workings of the brain. A neural network models the brain in a simple way by utilizing a number of simple units linked by weighted connections. The network is divided into layers that have different tasks. Within each layer there are individual units that are connected to units in layers above and below it.

All neural networks have input and output layers. The input layer contains dummy units which simply feed the input values into the network. Each unit has only one input or one output and the units perform no other function. The output layer units are processing units and perform calculations. They also contain the output that the network has produced. The individual processing units are connected to units in layers above and below it. The connections from the input layer and onward are themselves weighted, this represents the strength of that connection.

For processing units within hidden and output layers, each unit has a number of inputs (that are outputs from other units) and one output value. The function of the processing unit is to process its inputs and produce an output depending upon the value of the inputs. This is done by performing a sum of the inputs multiplied by the weight of the connection to which a particular input came.

In performing their processing, neural networks utilize a transfer function. The transfer function describes the rule that the processing unit uses to convert the activation input to an output. The function itself can be any function although it is more useful if it is continuous so that all possible activation inputs will have a corresponding output. The weights are a means of controlling the network so that it can learn. The weights control the activation so it directly affects the output of a processing unit. Adjusting the weights can allow the network to learn and recognize patterns.

For example, suppose that a single processing unit has a target output value. If the output of the processing unit is lower than the target, then the weight(s) can be increased until the activation is high enough for the output to be correct. Conversely if the output is too high then the weights can be reduced.

Artificial neural networks using a back-propagation algorithm provide a practical approach to a wide range of problems. Their hardware implementation may be necessary and essential because of the normal requirements for many applications. Hardware implemented in back-propagation neural networks can be trained in several ways including off-chip learning, chip-in-the-loop learning and on-chip learning. In off-chip learning, all computations are performed off the chip. Once the solution weight state has been found, the weights are downloaded to the chip. In the chip-in-the-loop application, the errors are calculated with the output of the chip, but the weight updates are calculated and performed off the chip. In the case of on-chip learning, the weight updates are calculated and applied on the chip. Deciding which of the aforementioned three methods to apply is not always clear-cut in practice and may depend not only on the application, but also on the network topology, specifically, constraints set by the network topology. On-chip learning is advantageous when the system requires the following: 1) higher speed; 2) autonomous operation in an unknown and changing environment; 3) small volume; and 4) reduced weight.

One of the most important components of the neural network is the neuron, whose performance and complexity greatly affect the whole neural network. In prior art neural networks, the activation function of the neuron is the sigmoid. In the on-chip back-propagation learning method, both a non-linear function, such as the sigmoid, and its derivative are required. Increasingly, neural networks are required that utilize a simple neuron circuit that realizes both a neuron activation function and its derivative. Existing neural networks do not provide on-chip neuron circuits that realize both a neuron activation function and its derivative. In addition, existing neural networks do not provide a threshold and gain factor of a neuron that can be easily programmed according to different requirements.

SUMMARY OF THE INVENTION

In accordance with the current invention, a back-propagation neural network with enhanced neuron characteristics method and system are provided that avoid the problems associated with prior art neural networks as discussed herein above.

In one aspect, a neural network system includes a feedforward network comprising at least one neuron circuit for producing an activation function and a first derivative of the activation function, a weight updating circuit for providing updated weights to the feedforward network. The system also includes an error back-propagation network for receiving the first derivative of the activation function and to provide weight change data information to the weight updating circuit.

In another aspect, a method for establishing a neural network includes producing an activation function and a first derivative of the activation function utilizing at least one neuron circuit in a feedforward network. Next, the method includes providing updated weights to the feedforward network utilizing a weight updating circuit. Finally, the method includes receiving the first derivative of the activation function by an error back-propagation network and providing weight change data information to the weight updating circuit from the error back-propagation network.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION OF THE PREFERRED EMBODIMENTS

Reference will now be made to various embodiments according to this invention, examples of which are shown in the accompanying drawings and will be obvious from the description of the invention. In the drawings, the same reference numbers represent the same or similar elements in the different drawings whenever possible.

Figure 1:
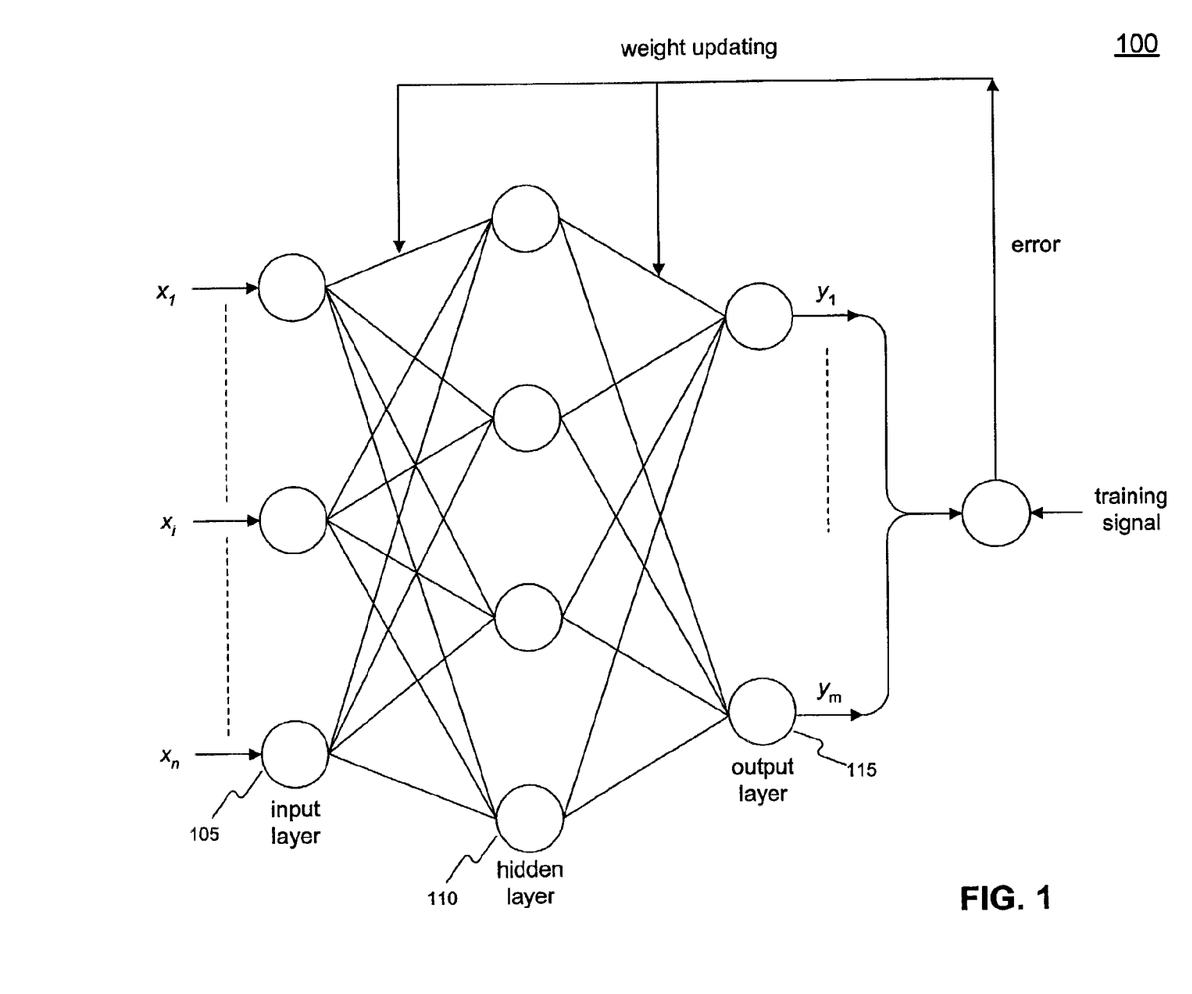
FIG. 1 is a functional block diagram of a back-propagation network structure 100 consistent with the present invention.

FIG. 1 shows a back-propagation network structure 100 consistent with the invention. Back-propagation network structure 100 comprises input layer 105, hidden layer 110, and an output layer 115. Using switches, a re-configurable back-propagation network can be formed in which both the number of layers and the number of neurons within each layer can be adjusted. The transfer function of each neuron is the sigmoid function expressed by equation 1, $$f(s) = \frac{1}{1 + e^{-as}} \quad (1)$$

where $\alpha$ is the gain factor and s is the sum of the weighted inputs. With R as the number of the training set elements, $w_{ij}^l$ is the weight between the $i^{th}$ ($0 \leq i < n$) neuron of the $(l-1)^{th}$ layer and the $j^{th}$ neuron of the $l^{th}$ ($l=1, 2, \ldots, L$) lay and $$\theta_j^l$$

is the threshold of the $j^{th}$ neuron of the $l^{th}$ layer. For convenience, let $$\theta_j^l = w_{nj}^l, x_n^{l-1} = 1.$$

For a certain training sample r(r=1, 2, ..., R), $$x_{i,r}^{l-1}$$

is the output of the $i^{th}$ neuron of the $(l-1)^{th}$ layer;

$$x_{j,r}^l$$

is the output of the $j^{th}$ neuron of the $l^{th}$ layer; and $t_{j,r}$ is the target value when l=L; $s_{j,r}^l$ is the weighted sum from the neurons of the $(l-1)^{th}$ layer to the $j^{th}$ neuron of the $l^{th}$ layer. The feedforward calculation can be expressed as follows, $$x_{j,r}^l(k) = f(s_{j,r}^l(k)) = f\left(\sum_{i=0}^n w_{ij}^l(k) x_{i,r}^{l-1}(k)\right). \quad (2)$$

To describe the error back-propagation process, several definitions should be made first. The neuron error is defined as, $$\varepsilon_{ij,r}^l(k) = \begin{cases} t_{j,r} - x_{j,r}^l(k), & l = L \\ \sum_j w_{ij}^{l+1}(k)\delta_{ij,r}^{l+1}(k), & 1 \leq l < L \end{cases} \quad (3)$$

where the weight error is defined as, $$\delta_{ij,r}^l(k) = f'(s_{j,r}^l(k))\varepsilon_{ij,r}^l(k) \quad (4)$$

The weight updating rule can be expressed as equation (5), $$w_{ij}^l(k+1) = w_{ij}^l(k) + \eta \sum_{r=1}^R \delta_{ij,r}^l(k) x_{j,r}^l(k) \quad (5)$$

when $\eta$ is the learning rate, $$\Delta w_{ij}^l(k+1) = \sum_{r=1}^R \delta_{ij,r}^l(k) x_{j,r}^l(k)$$

is the weight change.

Figure 2:
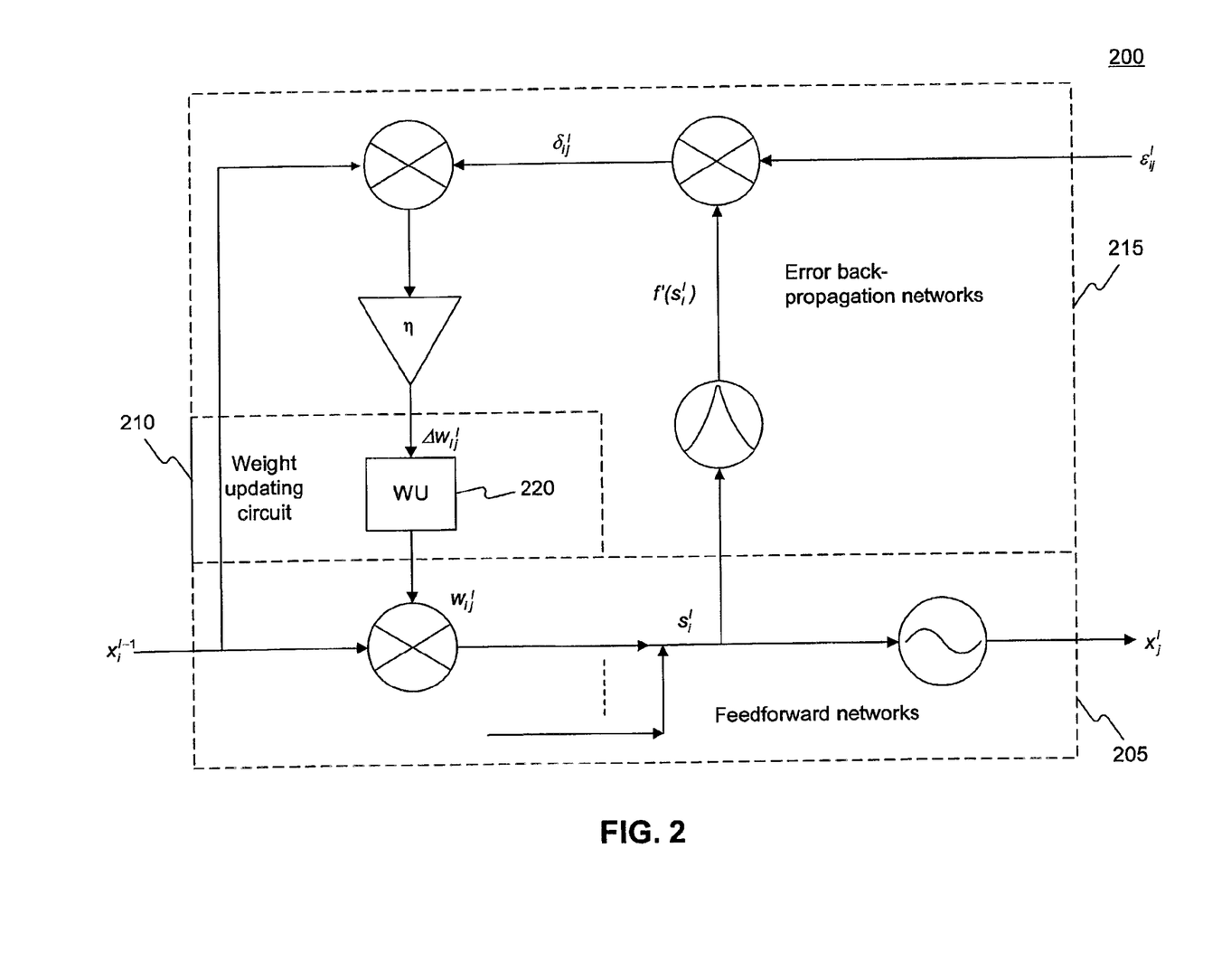
FIG. 2 is a functional block diagram of a neural network system 200 consistent with the present invention.
Figure 3:
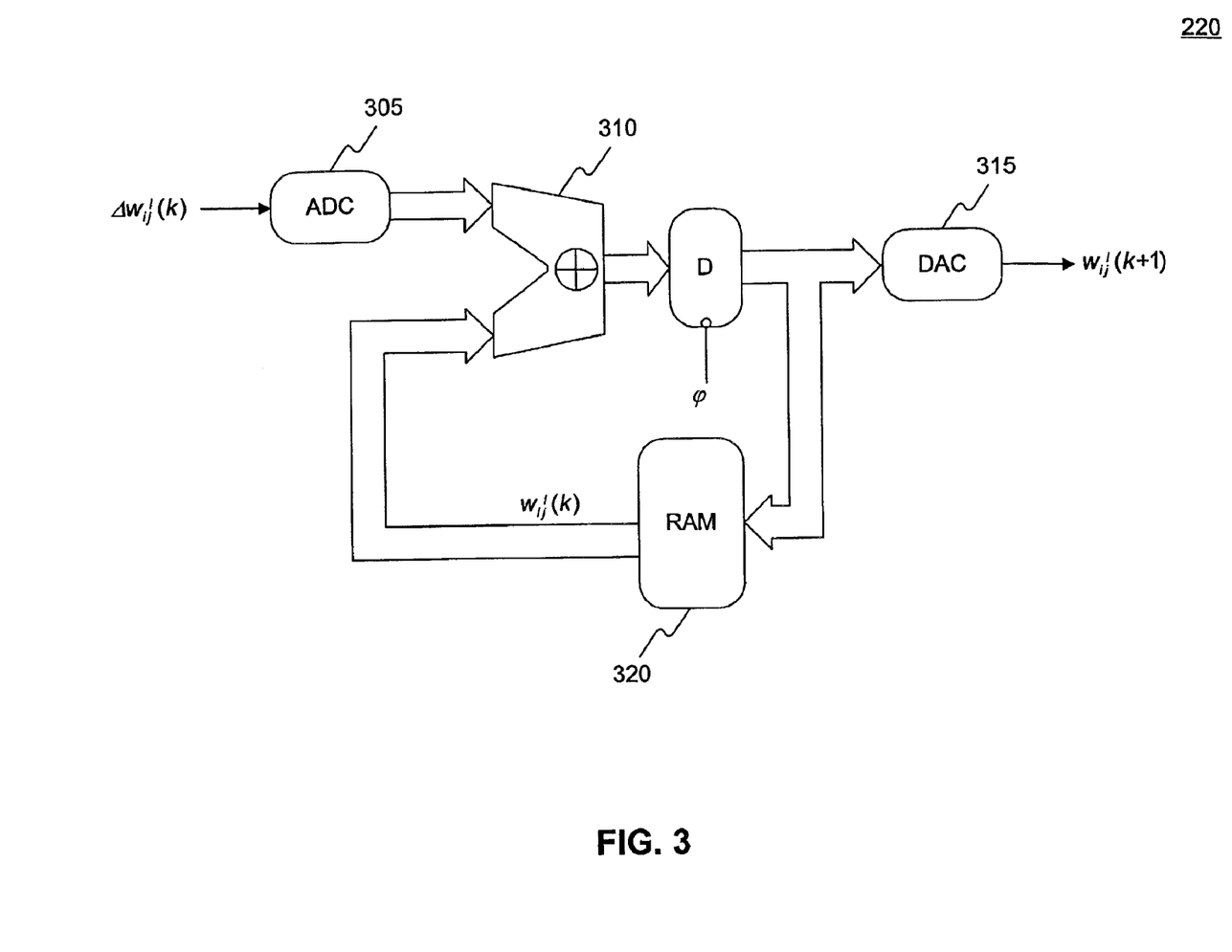
FIG. 3 is a functional block diagram of a weight unit 222 used in conjunction with the neural network system 200 of FIG. 2 consistent with the present invention.

FIG. 2 shows a neural network system 200 consistent with the present invention that may be designed according to the back-propagation network structure 100 as discussed with respect to FIG. 1. Neural network system 200 comprises a feedforward network 205, a weight updating circuit 210, and an error back-propagation network 215. In feedforward network 205, the synapse is realized by the Gilbert multiplier, which is simple and area-economic. A nonlinear I-V transfer function is accomplished by a neuron. Using the forward difference method, the neuron generates a sigmoidal function and its derivative. The derivative is used in the error back-propagation network 215 that also includes multipliers. A weight unit 220 implements the weight update operations as shown in FIG. 3. Weight unit 220 comprises an analog to digital converter 305, which may comprise a 7-bit analog to digital converter. Analog to digital converter 305 is used to convert the analog weight change signal into digital form, which may then be added by an adder 310 to a 12-bit weight. The new weight from the output of adder 310 is converted to an analog signal by a digital to analog converter 315 for the next feedforward calculation. The new weight is stored in a random access memory 320 for the next weight updating.

Figure 4:
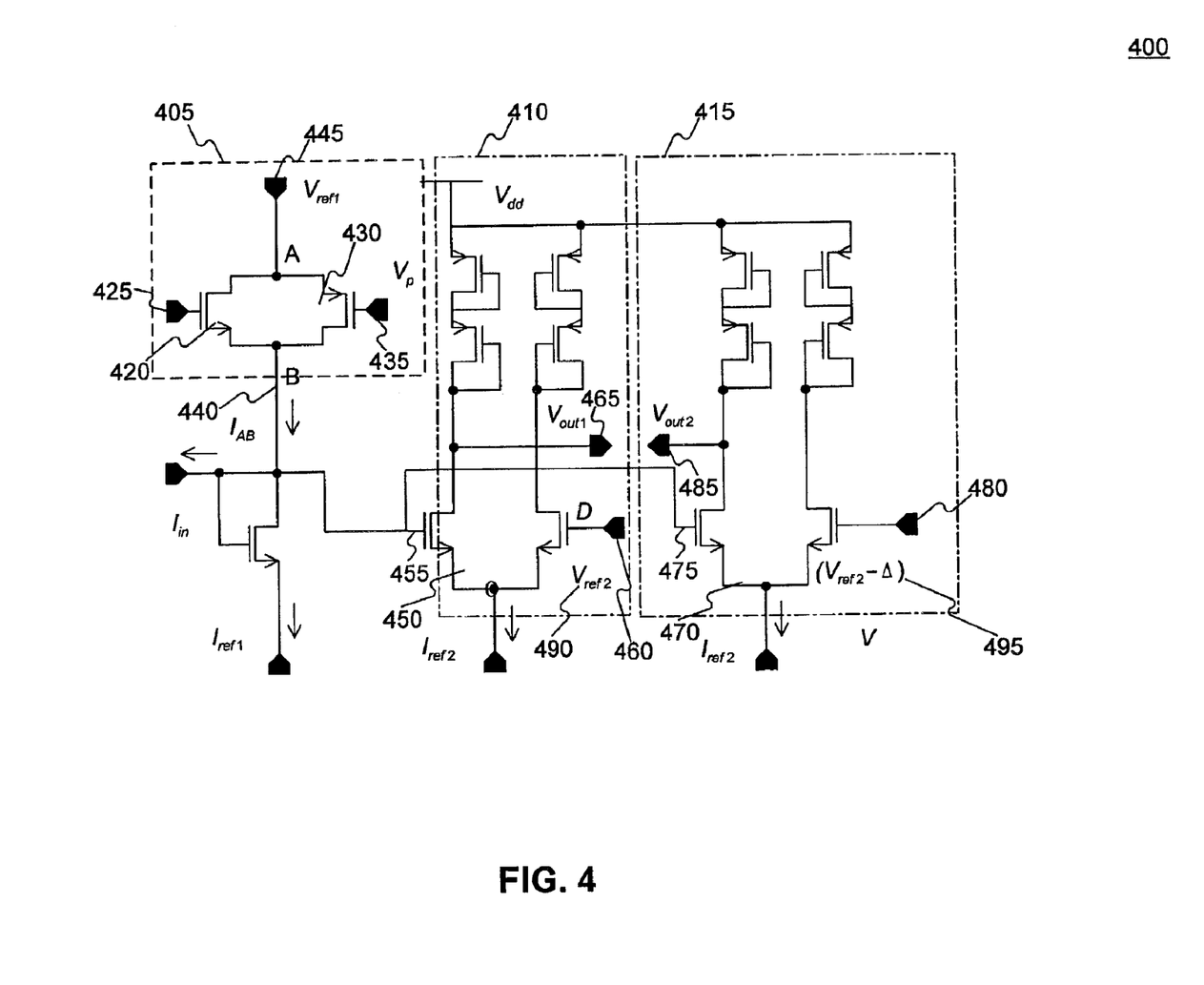
FIG. 4 is a functional block diagram of a neuron circuit 400 used in conjunction with the neural network system 200 of FIG. 2 consistent with the present invention.

FIG. 4 shows a neuron circuit 400 consistent with the invention comprising a linear resistor circuit 405, a first differential circuit 410, and a second differential circuit 415.

Linear resistor circuit 405, having a resistance value $R_{AB}$, comprises a first linear resistor circuit transistor 420 including a first linear resistor circuit transistor gate voltage 425 ($V_N$), a second linear resistor circuit transistor 430 including a second linear resistor circuit transistor gate voltage 435 ($V_P$), a linear resistor circuit output 440, and a first reference voltage 445 ($V_{ref1}$). First reference voltage 445 ($V_{ref1}$) is chosen so that both first linear resistor circuit transistor 420 and second linear resistor circuit transistor 430 transistors work in their linear range. Linear resistor circuit 405 can be controlled by first linear resistor circuit transistor gate voltage 425 ($V_N$) and second linear resistor circuit transistor gate voltage 435 ($V_P$).

First differential circuit 410 comprises a first differential transistor pair 450, a first differential transistor pair first port 455, a first differential transistor pair second port 460, a first differential circuit output 465 ($V_{out1}$), and a second reference voltage 490 ($V_{ref2}$). Second differential circuit 415 comprises a second differential transistor pair 470, a second differential transistor pair first port 475, a second differential transistor pair second port 480, a second differential circuit output 482, and a third reference voltage 495.

Both first differential transistor pair 450 and second differential transistor pair 470 may comprise simple differential transistor pairs comprising identical transistors. First differential transistor pair first port 455 and second differential transistor pair first port 475 are electrically connected to linear resistor circuit output 440. First differential transistor pair second port 460 is supplied with second reference voltage 490 ($V_{ref2}$) that may comprise a fixed voltage. Similarly, second differential transistor pair second port 480 is supplied with third reference voltage 495 that may comprise $V_{ref2}$–$\Delta V$, where $\Delta V$ is fixed small voltage. $I_{ref1}$ and $I_{ref2}$ are fixed current sources and $V_{dd}$ may be supplied with a 3.3 v voltage source.

With its respective active load, first differential circuit 410 realizes a sigmoidal shaped activation function at first differential circuit output 465 ($V_{out1}$). Similarly, with its respective active load, second differential circuit 415 realizes a signal at second differential circuit output 485 ($V_{out2}$). When the signal at second differential circuit output 485 ($V_{out2}$) is subtracted from first differential circuit output 465 ($V_{out1}$), the approximate derivative of the sigmoidal shaped activation function at first differential circuit output 465 ($V_{out1}$) is realized.

Assuming that the transistors of first differential transistor pair 450 are operating in saturation and follow an ideal square law, the drain current of transistor connected directly to linear resistor circuit output 440 can be expressed as $$I_{d3}(V_d) = \frac{\beta}{2}(V_B - V_C)^2 = \frac{I_{ref2}}{2} + \frac{\beta}{4} V_d \sqrt{\frac{4I_{ref2}}{\beta} - V_d^2} \quad (6)$$

with the input differential voltage $V_d$ ($V_d = V_B - V_{ref2}$) in a finite region of $$|V_d| \leq \sqrt{\frac{2I_{ref2}}{\beta}} \quad (7)$$

Here $\beta$ is the transconductance parameter for the transistors of first differential transistor pair 450.

When $I_{in}$ is small, $$V_d > \sqrt{\frac{2I_{ref2}}{\beta}},$$

$V_{out1}$ remains the low saturation voltage. As $I_{in}$ increases, $V_B$ descends tardily and $V_{out1}$ increases slowly. When $$V_d < -\sqrt{\frac{2I_{ref2}}{\beta}},$$

$V_{out1}$ reaches and remains the high saturation level.

Assuming that $V_{out}$=$V_{out}(I_{in})$ is the generated neuron activation function, using the forward difference method, the approximate derivative voltage $V_{deriv}$ is achieved by subtracting $V_{out2}$ from $V_{out1}$ as follows $$V'_{out}(I_{in}) = V'_{out}(V_d) \cdot V'_d(I_{in}) \quad (8)$$

$$\cong -\frac{V_{out}(V_B - V_{ref2} + \Delta V) - V_{out}(V_B - V_{ref2})}{\Delta V} \cdot R_{AB}$$

$$V_{deriv}(I_{in}) \equiv \frac{\Delta V}{R_{AB}} \cdot V'_{out}(I_{in}) \quad (9)$$

$$\cong -(V_{out}(V_B - (V_{ref2} - \Delta V)) - V_{out}(V_B - V_{ref2}))$$

$$= V_{out1} - V_{out2}$$

Figure 5:
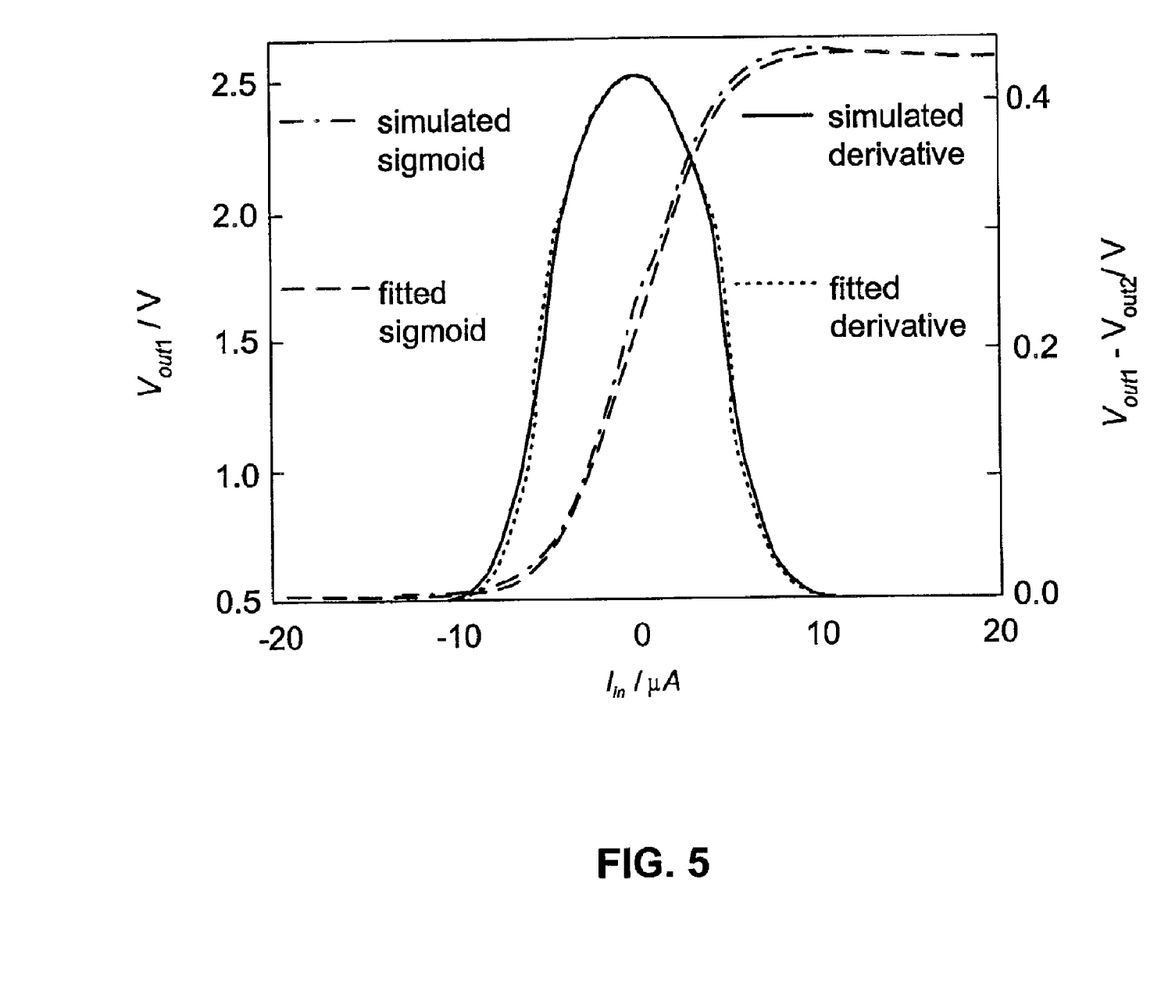
FIG. 5 is a graphical representation of the results of a computer simulation of the neuron circuit 400 of FIG. 4 consistent with the invention

FIG. 5 shows the results of a computer simulation of neuron circuit 400 of FIG. 4 consistent with the invention. This simulation was performed using HSPICE circuit simulation software marketed by Avanti Corporation of 46871 Bayside Parkway, Fremont, Calif., 94538. The computer simulation of neuron circuit 400 was performed using level 47 transistor models for a standard 1.2 μm CMOS process. The dash-dot line and the dash line of FIG. 5 show the simulated activation function from first differential circuit output 465 of neuron circuit 400 and its fitted sigmoid function respectively. From this simulation, the error between the fitted sigmoid function and first differential circuit output 465 is less than 3%. The solid line and the dot line of FIG. 5 show the derivative found by the simulation of neuron circuit 400 and the first derivative of a fitted sigmoid function respectively. From this simulation, the relative error between the first derivative of a fitted sigmoid function and the first differential circuit output 465 minus the second differential circuit output 485 is less than 5%.

One advantage of neural network system 200 of FIG. 2 is derived from its ability to adapt to an unknown and changing environment. Therefore, good I programmability is of fundamental importance. Specifically, different applications of neural network system 200 may need different gain factors a and threshold vector $\ominus$. Different gain factors a and threshold vector $\ominus$ can be realized by varying $I_{ref1}$, first linear resistor circuit transistor gate voltage 425 ($V_N$), and second linear resistor circuit transistor gate voltage 435 ($V_P$).

The threshold vector $\ominus$ can be adjusted by changing the reference current $I_{ref1}$. When $I_{ref1}$ increases, the current $I_{in}$ needed to satisfy $$V_B - V_{ref2} > \sqrt{\frac{2I_{ref2}}{\beta}}$$

decreases, so the activation curve shifts to the left. Otherwise, the curve shifts to the right.

The gain factor α can be varied by changing first linear resistor circuit transistor gate voltage 425 ($V_N$) and second linear resistor circuit transistor gate voltage 435 ($V_P$). When both first linear resistor circuit transistor 420 and second linear resistor circuit transistor 430 are working in their linear range and their sizes are chosen in such a way that $\beta_1=\beta_2$, the equivalent linear resistor value $R_{AB}$ is written as $$R_{AB} = \frac{1}{\beta_1\left[(V_N - V_P) - (V_{\tau 1} + |V_{\tau 2}|)\right]} \quad (10)$$

Equation 10 shows that the bigger ($V_N$–$V_P$) is, the less $R_{AB}$ is. That is, the less the slope of $V_B$ versus $I_{in}$ is. This means that the more slowly $V_{out1}$ increases, the smaller the gain factor.

Figure 6A:
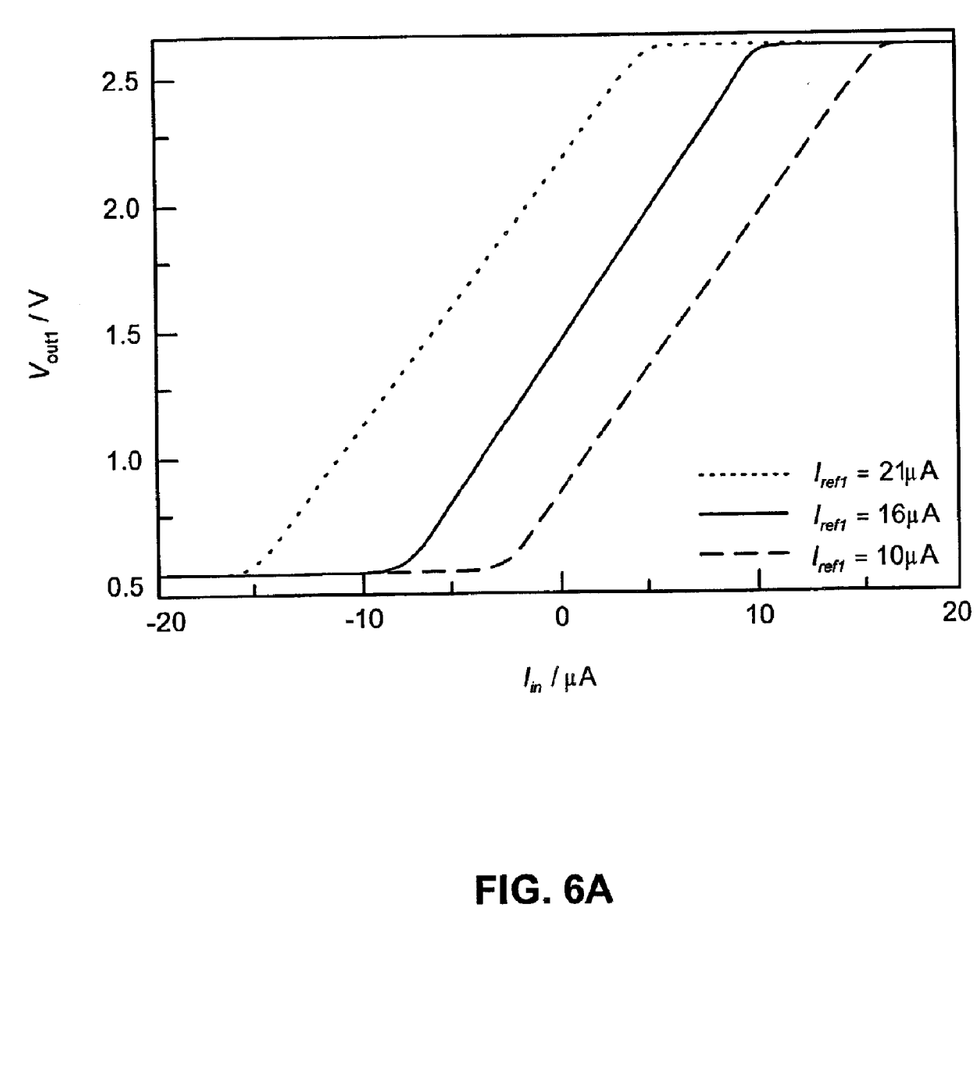
FIG. 6A is a graphical representation of the results of a computer simulation of the simulated activation function from the first differential circuit output 465 of neuron circuit 400 of FIG. 4 with different thresholds.
Figure 6B:
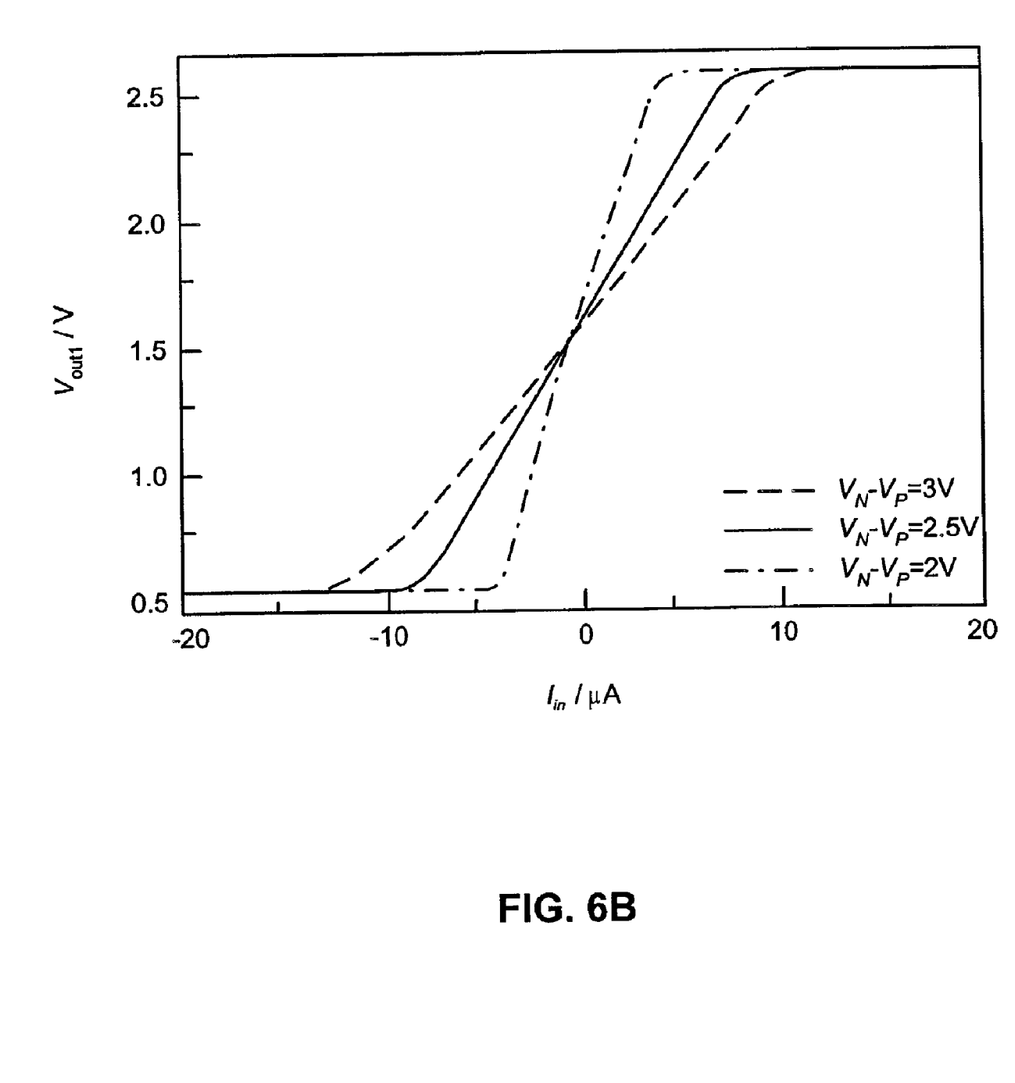
FIG. 6B is a graphical representation of the results of a computer simulation of the simulated activation function from the first differential circuit output 465 of neuron circuit 400 of FIG. 4 with various gain factors.

FIG. 6A shows the simulated activation function from first differential circuit output 465 of neuron circuit 400 with different thresholds. Different simulated activation functions from first differential circuit output 465 of neuron circuit 400 with various gain factors are shown in FIG. 6B. One advantage of neuron circuit 400 is that the saturation levels of the activation function from first differential circuit output 465 remains constant for different gain values. This ensures that for different gain values, the input linear range of synapse in a subsequent layer is completely used.

Figure 7A:
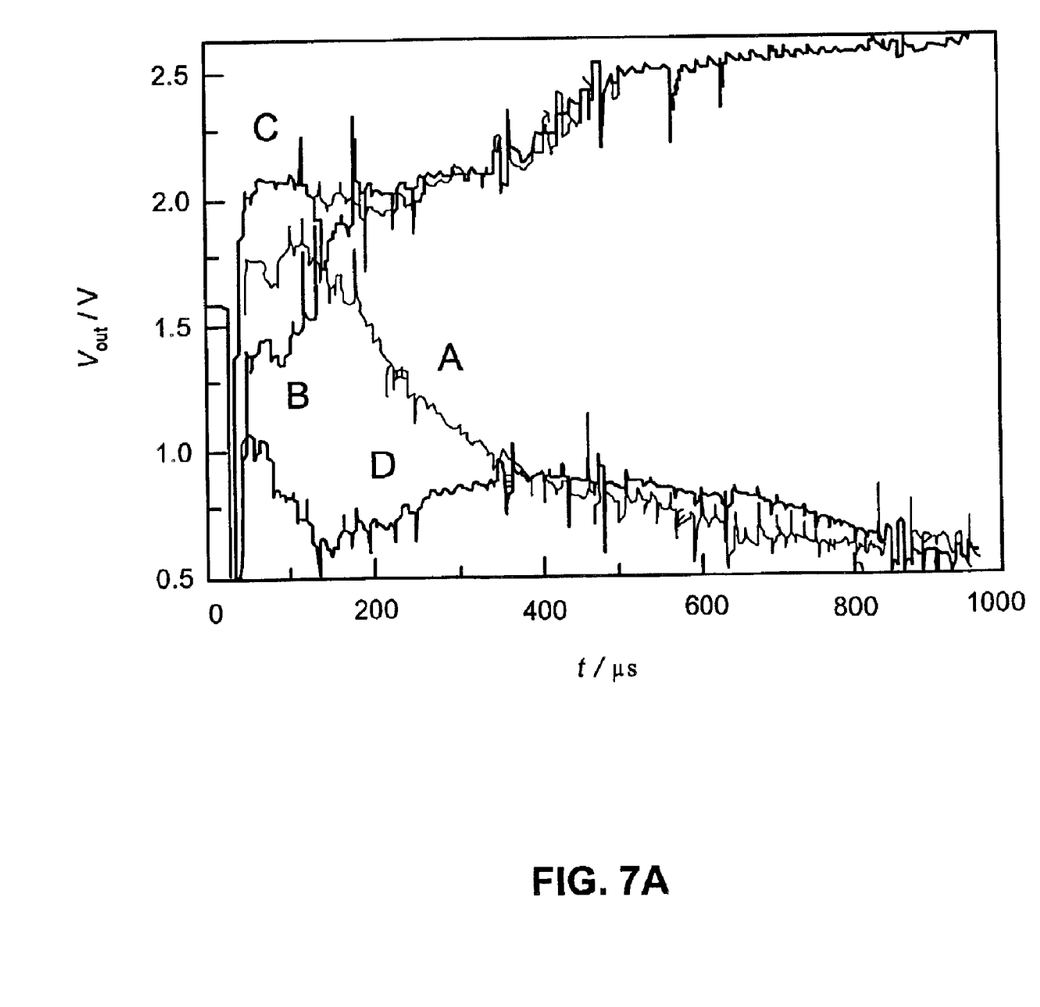
FIG. 7A is a graphical representation of the results of a computer simulation of the transient output of the training of the neural network system 200 of FIG. 2.
Figure 7B:
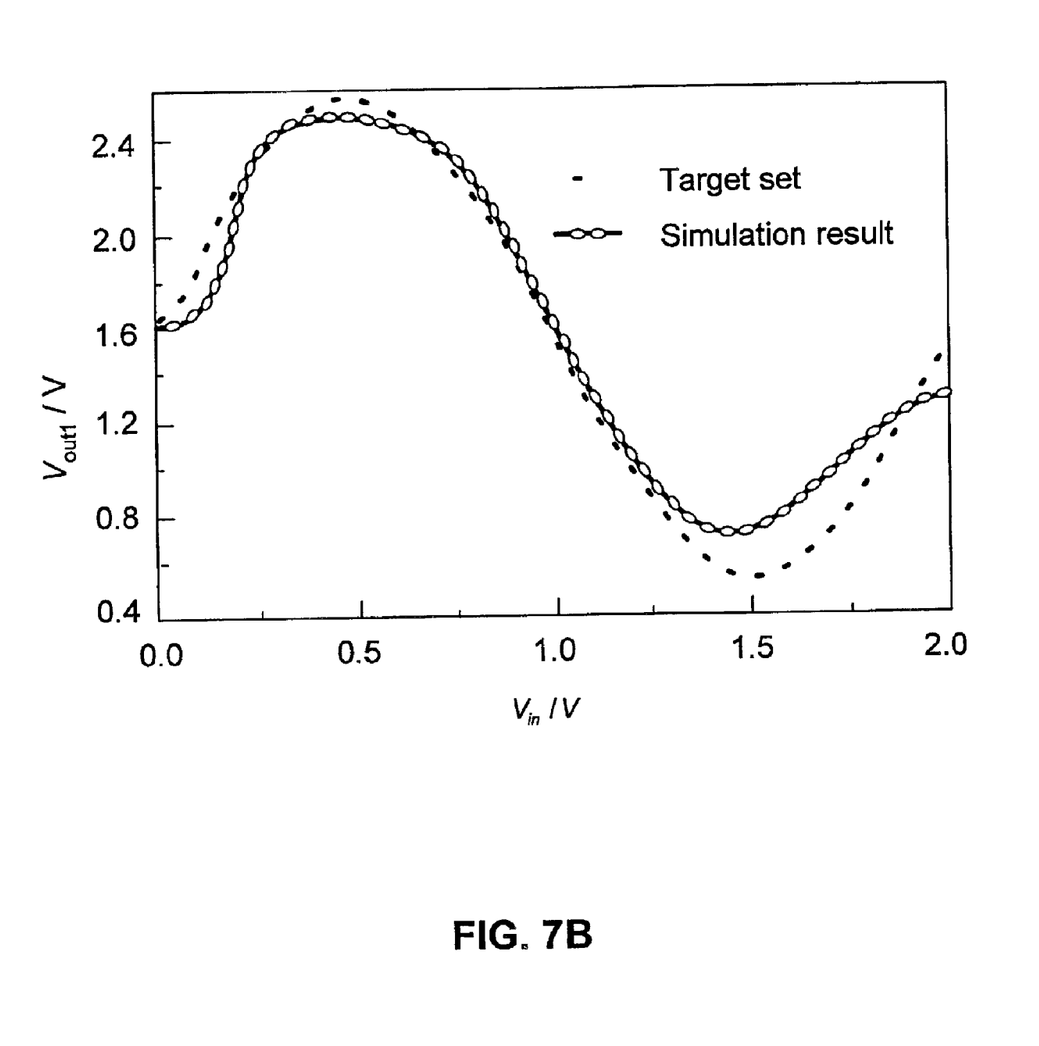
FIG. 7B is a graphical representation of the results of a computer simulation of the sin(x) function approximation.

Two additional experimental HSPICE simulations are shown in FIG. 7A and 7B to illustrate the operation of neural network system 200. The first experiment involves the non-linear partition problem, while the second involves the sin(x) function approximation.

FIG. 7A shows the transient output of the training of neural network system 200 configured as a 2-1 MLP. Considered that the low output voltage of the neuron is 0.52V, the high output voltage is 2.59V and the middle voltage is 1.56V, the simulation can be described as follows: if the two inputs are both lower than 1.56V or both greater than 1.56V, the output is 2.59V; otherwise the output is 1.56V. The corresponding input of lines, A, B, C and D in FIG. 7A are (1V, 1V), (1V, 2V), (2V, 1V), (2V, 2V) respectively and the corresponding targets are 0.52V, 2.59V, 2.59V and 0.52V respectively. It can be seen from FIG. 7A that the neural network system 200 reaches convergence within 1 ms.

The second experiment is the sin(x) function approximation, wherein a 1-5-1 configuration is used. These results are shown in FIG. 7B., in which the training set elements are shown as well as outputs of neural network system 200. It can be seen from the FIG. 7B that neural network system 200 can approximately the sin(x) function accurately.

It will be appreciated that a system in accordance with the invention can be constructed in whole or in part from special purpose hardware residing on one or a plurality of chips, a general purpose computer system, or any combination thereof, any portion of which may be controlled by a suitable program Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A neural network system comprising:
   a feedforward network comprising at least one neuron circuit for producing an activation function and a first derivative of the activation function;
   a weight updating circuit for producing updated weights to the feedforward network; and
   an error back-propagation network for receiving the first derivative of the activation function and to provide weight change data information to the weight updating circuit.

2. The system of claim 1, wherein the neuron circuit comprises:
   a linear resistor circuit;
   a first differential circuit electrically connected to the linear resistor circuit, the first differential circuit configured to output a first differential circuit output;
   a second differential circuit electrically connected to the linear resistor circuit, the second differential circuit configured to output a second differential circuit output; and
   wherein the first differential circuit output is the activation function and the first differential circuit output minus the second differential circuit output is the first derivative of the activation function.

3. The system of claim 2, wherein the linear resistor circuit comprises a first linear resistor circuit transistor and a second linear resistor circuit transistor configured in a differential transistor pair.

4. The system of claim 3, further comprising a first reference voltage configured to cause the first linear resistor circuit transistor and the second linear resistor circuit transistor to operate in a linear range.

5. The system of claim 4, wherein the first differential circuit output is shifted when the magnitude of the first reference voltage is varied.

6. The system of claim 3, wherein the linear resistor circuit is controllable by a first linear resistor circuit transistor gate voltage and a second linear resistor circuit transistor the gate voltage.

7. The system of claim 6, wherein a gain factor of the first differential circuit output is varied when the magnitude of the first linear resistor circuit transistor gate voltage and the second linear resistor circuit transistor the gate voltage are varied.

8. The system of claim 7, wherein saturation levels of the activation function remain constant for different gain factor values.

9. The system of claim 2, wherein:
   the first differential circuit comprises a first differential transistor pair having a first differential transistor pair first port electrically connected to a linear resistor circuit output and a first differential transistor pair second port electrically connected to a second reference voltage; and the second differential circuit comprises a second differential transistor pair having a second differential transistor pair first port electrically connected to the linear resistor circuit output and a second differential transistor pair second port electrically connected to a third reference voltage, the third reference voltage being less than the second reference voltage by a fixed amount.

10. The system of claim 2, wherein the error between a fitted sigmoid function and the first differential circuit output is less than 3%.

11. The system of claim 2, wherein the error between the first derivative of a fitted sigmoid function and the first differential circuit output minus the second differential circuit output is less than 5%.

12. The system of claim 1, wherein the neural network system is constructed on one electronic chip.

13. A method for establishing a neural network comprising:
  producing an activation function and a first derivative of the activation function utilizing at least one neuron circuit in a feedforward network;
  providing updated weights to the feedforward network utilizing a weight updating circuit;
  receiving the first derivative of the activation function by an error back-propagation network; and
  providing weight change data information to the weight updating circuit from the error back-propagation network.

14. The method of claim 13, wherein the neuron circuit comprises:
  a linear resistor circuit;
  a first differential circuit electrically connected to the linear resistor circuit, the first differential circuit configured to output a first differential circuit output;
  a second differential circuit electrically connected to the linear resistor circuit, the second differential circuit configured to output a second differential circuit output; and
  wherein the first differential circuit output is the activation function and the first differential circuit output minus the second differential circuit output is the first derivative of the activation function.

15. The method of claim 14, wherein the linear resistor circuit comprises a first linear resistor circuit transistor and a second linear resistor circuit transistor configured in a differential transistor pair.

16. The method of claim 15, further comprising a first reference voltage configured to cause the first linear resistor circuit transistor and the second linear resistor circuit transistor to operate in a linear range.

17. The method of claim 16, wherein the first differential circuit output is shifted when the magnitude of the first reference voltage is varied.

18. The method of claim 15, wherein the linear resistor circuit is controllable by a first linear resistor circuit transistor gate voltage and a second linear resistor circuit transistor the gate voltage.

19. The method of claim 18, wherein a gain factor of the first differential circuit output is varied when the magnitude of the first linear resistor circuit transistor gate voltage and the second linear resistor circuit transistor the gate voltage are varied.

20. The method of claim 19, wherein saturation levels of the activation function remain constant for different gain factor values.

21. The method of claim 14, wherein:
  the first differential circuit comprises a first differential transistor pair having a first differential transistor pair first port electrically connected to a linear resistor circuit output and a first differential transistor pair second port electrically connected to a second reference voltage; and
  the second differential circuit comprises a second differential transistor pair having a second differential transistor pair first port electrically connected to the linear resistor circuit output and a second differential transistor pair second port electrically connected to a third reference voltage, the third reference voltage being less than the second reference voltage by a fixed amount.

22. The system of claim 14, wherein the error between a fitted sigmoid function and the first differential circuit output is less than 3%.

23. The system of claim 14, wherein the error between the first derivative of a fitted sigmoid function and the first differential circuit output minus the second differential circuit output is less than 5%.

24. The system of claim 13, wherein the neural network system is constructed on one electronic chip.

25. A neural network system comprising:
  a feedforward network comprising at least one neuron circuit for producing an activation function and a first derivative of the activation function, the at least one neuron circuit comprising:
    a linear resistor circuit comprising,
      a first linear resistor circuit transistor and a second linear resistor circuit transistor configured in a differential transistor pair, and
      a first reference voltage configured to cause the first linear resistor circuit transistor and the second linear resistor circuit transistor to operate in a linear range,
    a first differential circuit electrically connected to the linear resistor circuit, the first differential circuit configured to output a first differential circuit output, the first differential circuit comprises a first differential transistor pair having a first differential transistor pair first port electrically connected to a linear resistor circuit output and a first differential transistor pair second port electrically connected to a second reference voltage,
    a second differential circuit electrically connected to the linear resistor circuit, the second differential circuit configured to output a second differential circuit output, the second differential circuit comprises a second differential transistor pair having a second differential transistor pair first port electrically connected to the linear resistor circuit output and a second differential transistor pair second port electrically connected to a third reference voltage, the third reference voltage being less than the second reference voltage by a fixed amount, and
    wherein the first differential circuit output is the activation function and the first differential circuit output minus the second differential circuit output is the first derivative of the activation function, the error between a fitted sigmoid function and the first differential circuit output is less than 3%, the error between the first derivative of a fitted sigmoid function and the first differential circuit output minus the second differential circuit output is less than 5%, the first differential circuit output is shifted when the magnitude of the first reference voltage is varied, the linear resistor circuit is controllable by a first linear resistor circuit transistor gate voltage and a second linear resistor circuit transistor the gate voltage, a gain factor of the first differential circuit output is varied when the magnitude of the first linear resistor circuit transistor gate voltage and the second linear resistor circuit transistor the gate voltage are varied, and saturation levels of the activation function remain constant for different gain factor values;

a weight updating circuit for producing updated weights to the feedforward network;

an error back-propagation network for receiving the first derivative of the activation function and to provide weight change data information to the weight updating circuit; and wherein the neural network system is constructed on one electronic chip.

\* \* \* \* \*